United States Patent [19]

Min

[11] Patent Number: 5,610,773
[45] Date of Patent: Mar. 11, 1997

[54] ACTUATED MIRROR ARRAY AND METHOD FOR THE MANUFACTURE THEREOF

[75] Inventor: Yong-Ki Min, Seoul, Rep. of Korea

[73] Assignee: Daewoo Electronic Co. Ltd., Seoul, Rep. of Korea

[21] Appl. No.: 428,757

[22] Filed: Apr. 25, 1995

[30] Foreign Application Priority Data

Apr. 30, 1994 [KR] Rep. of Korea .................. 94-9504

[51] Int. Cl.[6] .......................... G02B 5/08; G03B 21/28; G03B 21/14
[52] U.S. Cl. .................. 359/850; 359/295; 359/851; 353/99; 353/38
[58] Field of Search ........................ 359/259, 224, 359/225, 229, 291, 295, 246, 248, 846, 849, 850, 851, 855, 900, 883, 884, 889, 892, 893; 310/328, 366; 29/25.35; 353/38, 98, 122; 355/53

[56] References Cited

U.S. PATENT DOCUMENTS

| | | | |
|---|---|---|---|
| 3,886,310 | 5/1975 | Guldberg et al. | 178/7.5 D |
| 4,079,368 | 3/1978 | DiStefano | 350/359 |
| 4,119,368 | 10/1978 | Yamazaki | 350/360 |
| 4,229,077 | 10/1980 | Schwab | 350/293 |
| 4,670,338 | 6/1987 | Clemino | 428/312.6 |
| 4,874,979 | 10/1989 | Rapp | 310/366 |
| 4,985,926 | 1/1991 | Foster | 310/366 |
| 5,140,396 | 8/1992 | Needham et al. | 357/30 |
| 5,175,465 | 12/1992 | Um et al. | 359/883 |
| 5,287,215 | 2/1994 | Warde et al. | 359/293 |
| 5,301,404 | 4/1994 | Ochiai et al. | 29/25.35 |
| 5,361,170 | 11/1994 | Takeyasu | 359/850 |
| 5,376,857 | 12/1994 | Takeuchi et al. | 310/328 |
| 5,379,081 | 1/1995 | Kim et al. | 359/855 |
| 5,423,207 | 6/1995 | Flechsig et al. | 310/366 |

Primary Examiner—Margaret Rose Wambach
Assistant Examiner—My-Trang Nu Ton
Attorney, Agent, or Firm—Anderson Kill & Olick P.C.

[57] ABSTRACT

An array of M×N thin film actuated mirrors for use in an optical projection system comprises an active matrix, an array of M×N supporting members, M×N trinities of first, second and third conduits and an array of M×N thin film actuating structures. Each of the actuating structures includes a first, an electrodisplacive and a second layers, wherein the first and seconds layers are placed on top and bottom of the electrodisplacive layer. In each of the actuated mirrors, the first layer therein is connected, individually and electrically, to a conduction line pattern through the second and the third conduits, thereby acting as bias electrode and the second layer is connected electrically to one of the transistors included in through the first conduit to thereby act as a signal electrode.

18 Claims, 8 Drawing Sheets

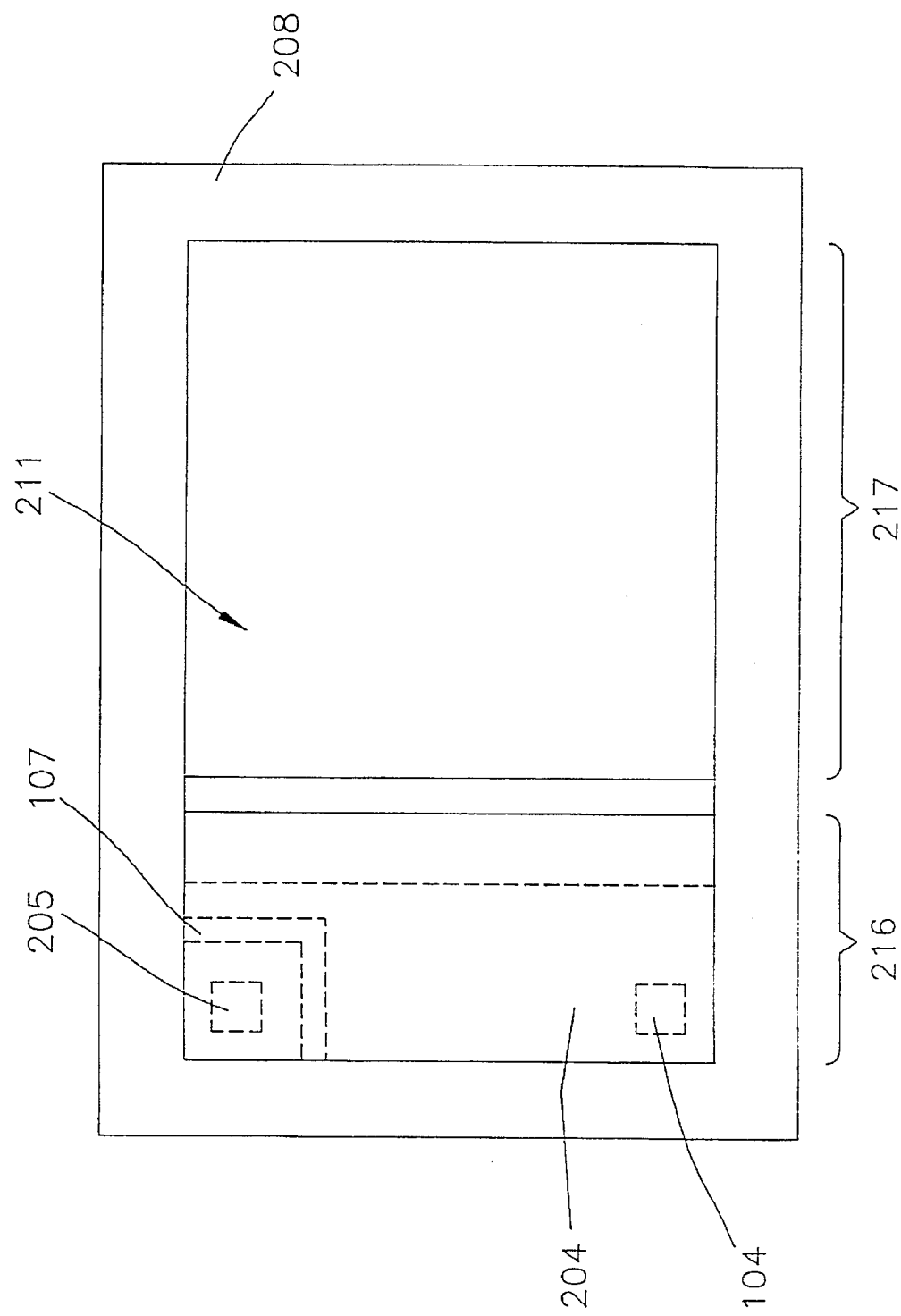

ACTUATED MIRROR ARRAY AND METHOD FOR THE MANUFACTURE THEREOF

FIELD OF THE INVENTION

The present invention relates to an optical projection system; and, more particularly, to an array of M×N thin film actuated mirrors for use in the system and a method for the manufacture thereof.

BACKGROUND OF THE INVENTION

Among the various video display systems available in the art, an optical projection system is known to be capable of providing a high quality display in a large scale. In such an optical projection system, light from a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIG. 1, there is shown a cross sectional view of an array 10 of M×N thin film actuated mirrors 11 for use in an optical projection system, disclosed in a copending commonly owned application, U.S. Ser. No. 08/331,399, entitled "THIN FILM ACTUATED MIRROR ARRAY AND METHOD FOR THE MANUFACTURE THEREOF", comprising an active matrix 12, an array 13 of M×N thin film actuating structures 14, an array 15 of M×N supporting members 16 and an array 17 of M×N mirrors 18.

The active matrix 12 includes a substrate 19, an array of M×N transistors (not shown) and an array 20 of M×N connecting terminals 21. Each of the actuating structures 14 in the array 13 is provided with at least a thin film layer 22 of an electrodisplacive material such as a piezoelectric material, e.g., lead zirconium titanate(PZT) or an electrostrictive material, e.g., lead magnesium niobate(PMN), a first electrode 23, a second electrode 24 and an elastic layer 25 made of a ceramic, wherein the first and second electrodes 23, 24 are placed on top and bottom of the electrodisplacive layer 22, and the elastic layer 25 is placed on bottom of the second electrode 24, respectively. Each of the supporting members 16 is used for holding each of the actuating structures 14 in place by cantilevering each of the actuating structures 14 and for electrically connecting each of the actuating structures 14 and the active matrix 12 by being provided with a conduit 26 made of a metal, e.g., tungsten(W). Furthermore, each of the mirrors 18, made of a light reflecting material, e.g., aluminum(Al), is placed on top of each of the actuating structures 14.

In the thin film actuated mirror array 10, an electrical signal is applied across the electrodisplacive layer 22 located between the first and the second electrodes 23, 24 in each of the actuating structures 14, causing a deformation thereof, which will, in turn, deform the mirror 18 placed on top thereof, thereby changing the optical path of the incident light beam.

There are a number of problems associated with the above-described array 10 of thin film actuated mirrors 11. Since the first electrode 23 in each of the actuating structures 14 is interconnected with other first electrodes 23 in other actuating structures 14 in the same row or column in the array 13, if one of the actuating structures 14 becomes inoperable for any reason, e.g., short-circuit, all of the other actuating structures 14 in the same row or column in the array 13 become inoperable. Furthermore, presence of the elastic layer 25 made of a ceramic in each of the actuating structures 14 necessitates a need to include an additional thin film layer manufacturing step which may further compound the already complicated overall manufacturing process.

SUMMARY OF THE INVENTION

It is, therefore, a primary object of the present invention to provide an array of M×N actuated mirrors for use in an optical projection system, wherein a first electrode in each one of the actuated mirrors is not connected with a first electrode in any of the other actuated mirrors in the same row or column in the array, thereby allowing a bias voltage to be applied individually to each of the actuated mirrors.

It is another object of the present invention to provide a method for manufacturing such an array of M×N actuated mirrors.

In accordance with one aspect of the present invention, there is provided an array of M×N thin film actuated mirrors for use in an optical projection system, each of the M×N thin film actuated mirrors capable of causing a deviation in the optical path of an incident light beam, said array comprising: an active matrix including a substrate, a conduction line pattern for carrying a bias voltage to each of the thin film actuated mirrors, an array of M×N transistors, each of the transistors being capable of providing an electrical signal to each of the thin film actuated mirrors, and an array of M×N pairs of connecting terminals, wherein one of the connecting terminals in each pair is connected electrically to one of the transistors and the other connecting terminal therein is connected electrically to the conduction line pattern; M×N trinities of a first, a second and a third conduits, wherein the first conduit is connected electrically to the connecting terminal connected to the transistor, and the second conduit is electrically connected to the connecting terminal connected to the conduction line pattern; an array of M×N supporting members, each of the supporting members being provided with the first and the second conduits; and an array of M×N thin film actuating structures, each of the thin film actuating structures including a first layer made of an electrically conducting and light reflecting material, an electrodisplacive layer having a top and a bottom surfaces, and a second layer made of an electrically conducting material, the first and the second layers being placed on the top and the bottom surfaces of the electrodisplacive layer, respectively, each of the actuating structures being provided with a proximal and a distal ends, the proximal end of each of the actuating structures being secured on top of each of the supporting members, the third conduit being formed between the first and the second layers, the first layer in each of the actuating structures being connected electrically to the connecting terminal connected to the conduction line pattern through the second and the third conduits to thereby allow it to function as a bias electrode as well as a mirror for reflecting the light beam and the second layer therein is connected electrically to the connecting terminal connected to the transistor through the first conduit to thereby allow it to function as a signal electrode, wherein the electrical signal applied across the electrodisplacive layer between the first and the second layers causes a deformation thereof, and hence said each of the actuating structures including the first layer acting as the mirror, thereby changing the optical path of the incident light beam.

In accordance with another aspect of the present invention, there is provided a method for manufacturing said array of M×N thin film actuated mirrors, said method comprising the steps of: (a) providing an active matrix having a top surface, the active matrix including a substrate, an array of M×N transistors, an array of M×N pairs of connecting terminals on the top surface thereof and a conduction line pattern; (b) forming a sacrificial layer on the top surface of the active matrix in such a way that the sacrificial layer completely covers the array of M×N pairs of connecting terminals; (c) removing portions of the sacrificial layer surrounding each pair of the connecting terminals; (d) forming a supporting member around each pair of connecting terminals by filling the portions with an insulating material; (e) forming a pair of a first and a second conduits in each of the supporting members, each of the conduits extending from top of each of the supporting members to each of the connecting terminals, wherein the first conduit is connected electrically to the transistor and the second conduit is electrically connected to the conduction line pattern; (f) depositing a second thin film layer made of an electrically conducting material on top of the sacrificial layer and the supporting members; (g) removing portions of the second thin film layer surrounding each of the first conduits; (h) isolating electrically the first conduit from the second conduit and hence the first connecting terminal from the second connecting terminal by filling the portions with an insulating material; (i) forming an electrodisplacive layer on top of the second layer; (j) forming an array of M×N portions without the electrodisplacive material on the electrodisplacive layer; (k) forming an array of M×N third conduits by filling the portions with an electrically conducting material; (l) depositing a first thin film layer made of an electrically conducting and light reflecting material to form an actuated mirror structure; (m) patterning the actuated mirror structure into an array of M×N semifinished actuated mirror structures; (n) patterning the first thin film layer in each of the semifinished actuated mirror structures into a proximal and a distal ends to form an array of M×N actuated mirror structures, wherein the proximal and the distal ends thereof are separated physically and electrically from each other and the proximal end thereof is in an electrical contact with the third conduit; and (o) removing the sacrificial layer from each of the actuated mirror structures to thereby form said array of M×N thin film actuated mirrors.

BRIEF DESCRIPTION OF THE DRAWINGS

The above and other objects and features of the present invention will become apparent from the following description of preferred embodiments given in conjunction with the accompanying drawings, wherein:

FIG. 3 represents a top view of a thin film actuated mirror constituting the array shown in FIG. 2; and FIGS. 4(A) to 4(I) reproduce schematic cross sectional views setting forth the manufacturing steps for the preferred embodiment in accordance with the present invention.

DETAILED DESCRIPTION OF THE PREFERRED EMBODIMENTS

Figure 1:
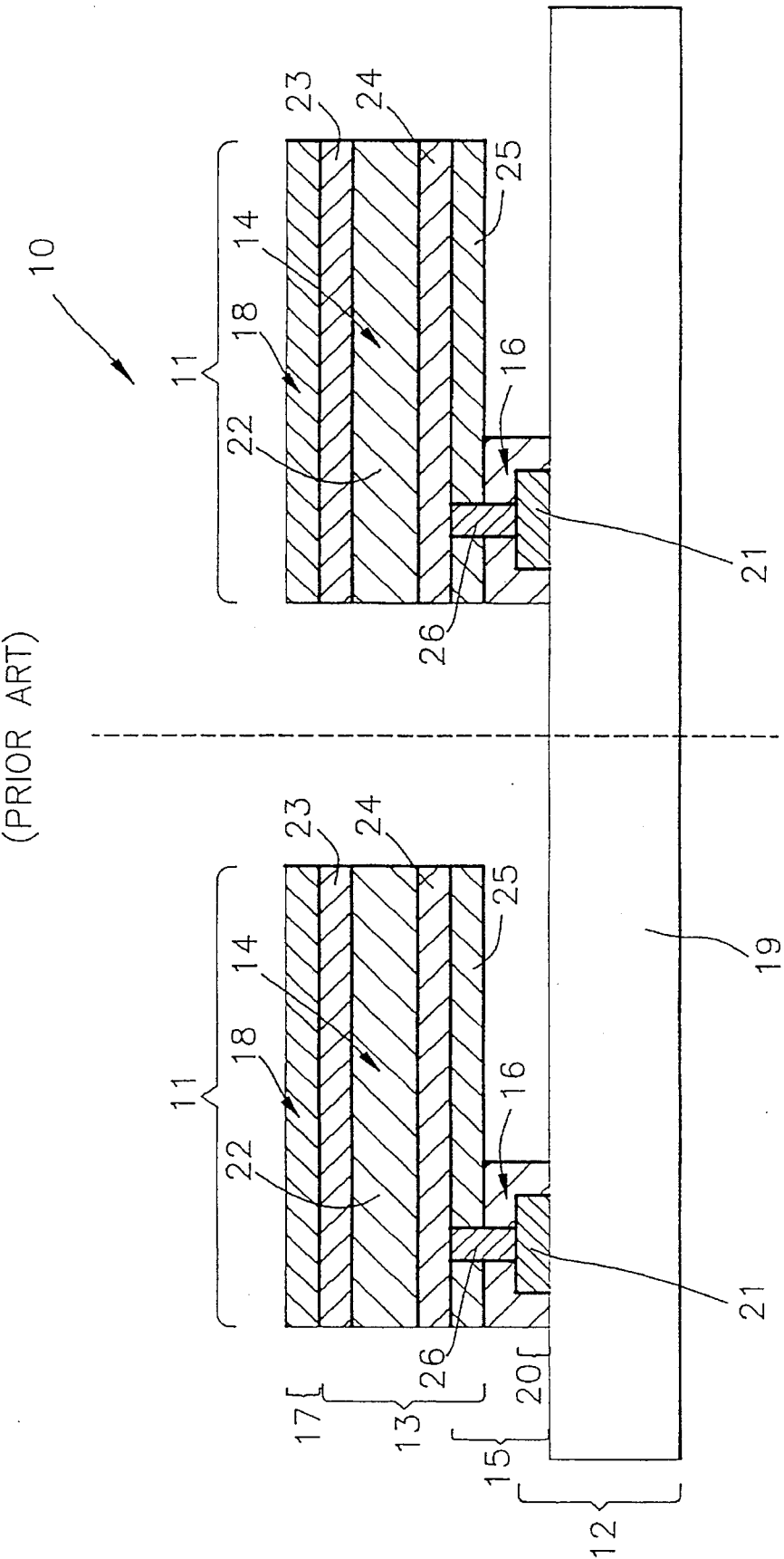
FIG. 1 shows a cross sectional view of an array of M×N thin film actuated mirrors previously disclosed.
Figure 2:
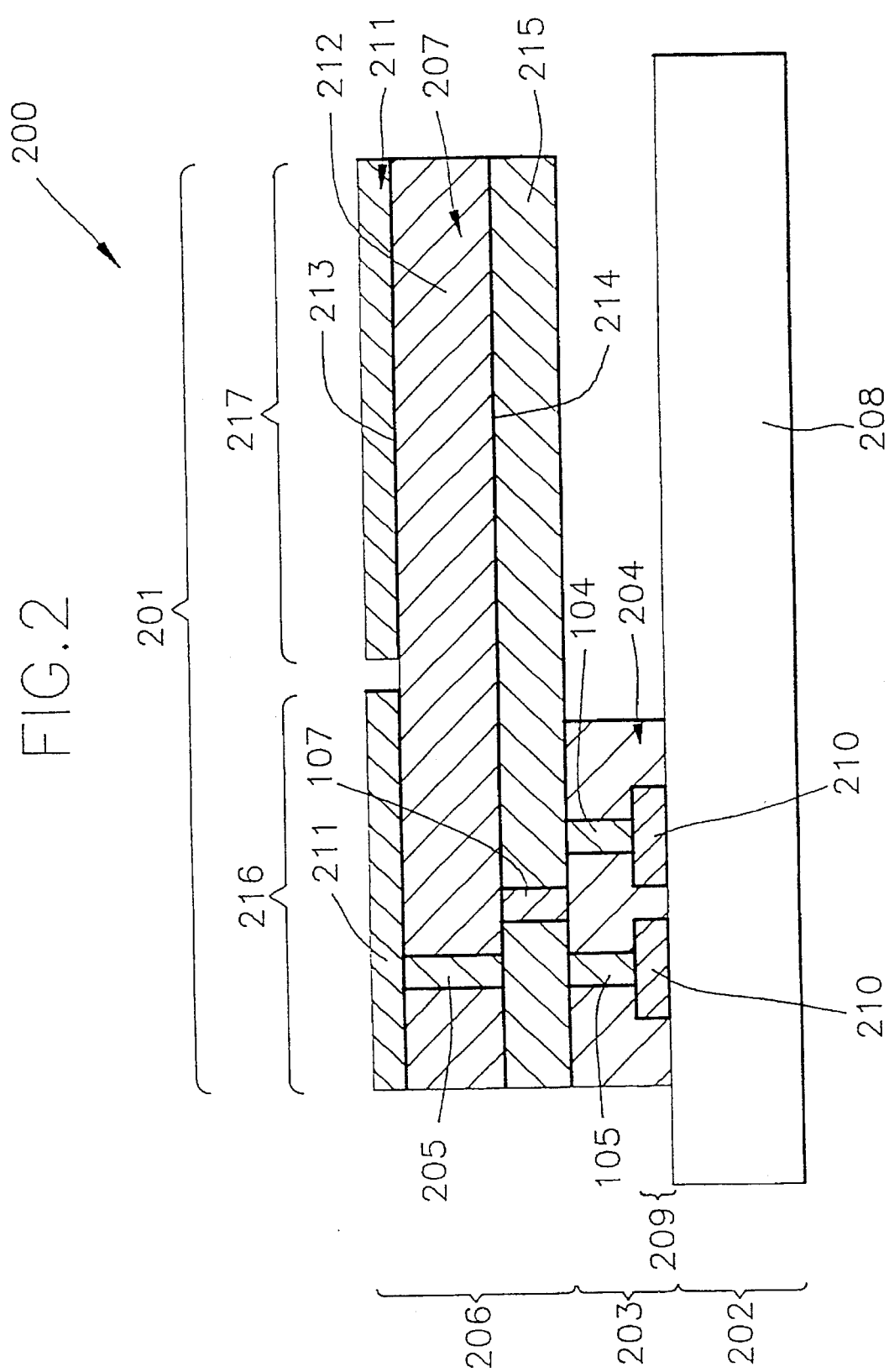
FIG. 2 illustrates a cross sectional view of an array of M×N thin film actuated mirrors in accordance with a preferred embodiment of the present invention.

Referring now to FIGS. 2 to 4, there are provided schematic cross sectional and top views of an array 200 of M×N thin film actuated mirrors 201 for use in an optical projection system and a method for the manufacture thereof, wherein M and N are integers, in accordance with preferred embodiments of the present invention. It should be noted that like parts appearing in FIGS. 2 to 4 are represented by like reference numerals.

In FIG. 2, there is illustrated a cross sectional view of the array 200 comprising an active matrix 202, an array 203 of M×N supporting members 204, M×N trinities of a first, a second and a third conduits 104, 105, 205 and an array 206 of M×N thin film actuating structures 207.

The active matrix 202 includes a substrate 208, an array of M×N transistors(not shown), an array 209 of M×N pairs of a first and a second connecting terminals 210, and a conduction line pattern (not shown), wherein each of the transistors is used for providing an electrical signal to each of the thin film actuated mirrors 201, the conduction line pattern serves to provide a bias voltage to each of the thin film actuated mirrors 201, and the first and the second connecting terminals 210 in each pair are connected electrically to the transistor and the conduction line pattern, respectively.

Each of the supporting members 204, made of an insulating material, e.g., silicon nitride($Si_3N_4$), is provided with a pair of a first and a second conduits 104, 105 made of a metal, e.g., tungsten(W), wherein the first and the second conduits 104, 105 in the pair are connected electrically to the first and the second connecting terminals 210, respectively.

Each of the actuating structures 207 includes a first layer 211, an electrodisplacive layer 212 having a top and a bottom surfaces 213, 214, the third conduit 205 and a second layer 215. Furthermore, each of the actuating structures 207 is provided with a proximal and a distal ends 216, 217. The first layer 211 is made of an electrically conducting and light reflecting material, e.g., silver(Ag), and has a thickness of 500~2000 Å, the electrodisplacive layer 212 is made of a piezoelectric material, e.g., PZT, or an electrostrictive material, e.g., PMN, and has a thickness of 0.7~2 μm, and the second layer 215 is made of an electrically conducting material, e.g., platinum(Pt), and has a thickness of 0.7~2 μm.

In each of the actuating structures 207, the first and the second layers 211, 215 are placed on the top and the bottom surfaces 213, 214 of the electrodisplacive layer 212, and the proximal end 216 thereof is secured on top of each of the supporting members 204. In addition, portions 107 at the proximal end 216 of the second layer 215, surrounding and in an electrical contact with the second conduit 105, is removed and then filled with an insulating material, e.g., $SiO_2$, thereby electrically isolating the first conduit 104 from the second conduit 105, allowing the second layer 215 to be connected to the transistor through the first conduit 104 to thereby enable it to function as a signal electrode. The third conduit 205 bridges electrically the first layer 211 with the portions of the second layer 215 in an electrical contact with the second conduit 105, allowing the first layer 211 to be electrically connected to the conduction line pattern through the second and the third conduits 105, 205, thereby enabling it to function as a bias electrode as well as a mirror for reflecting the light beam.

As shown in FIG. 3, the first layer 211 is divided into a proximal and a distal ends 216, 217, wherein the proximal and the distal ends 216, 217 thereof are separated physically and electrically from each other and the proximal end 216 thereof is in an electrical contact with the third conduit 205 and hence the conduction line pattern.

When an electrical signal is applied across the electrodisplacive layer 212 between the first and the second layers 211, 215, it results in a deformation thereof, and hence a deformation of the actuating structure 207, including the first layer 211 acting as the mirror, thereby changing the optical path of the incident light beam.

In the inventive array 200 of M×N actuated mirrors 201, a bias voltage is applied individually to each of the actuated mirrors 201, unlike the array 10 disclosed previously, to thereby eliminate a risk of the actuated mirrors 201 in the same row or column not operating when one of them becomes inoperable.

Figure 4A:
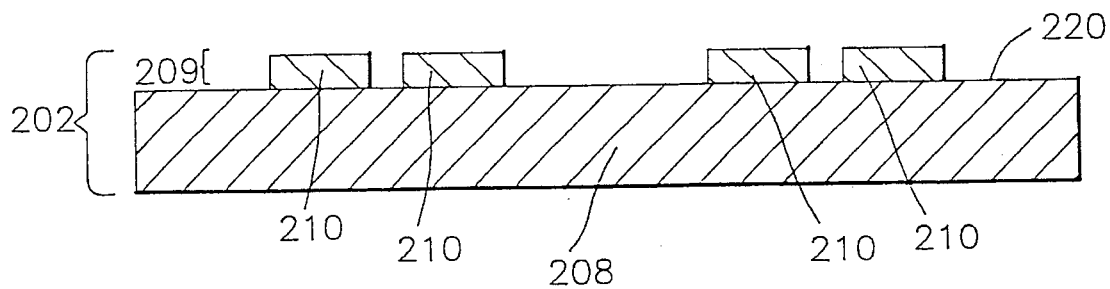

There are illustrated in FIGS. 4A to 4I the manufacturing steps involved in manufacturing the inventive array 200 of M×N thin film actuated mirrors 201. The process for manufacturing the array 200 begins with the preparation of the active matrix 202 having a top surface 220, comprising the substrate 208, the array of M×N transistors(not shown), the conduction line pattern(not shown), and the array 209 of M×N pairs of first and second connecting terminals 210, as shown in FIG. 4A.

Figure 4B:
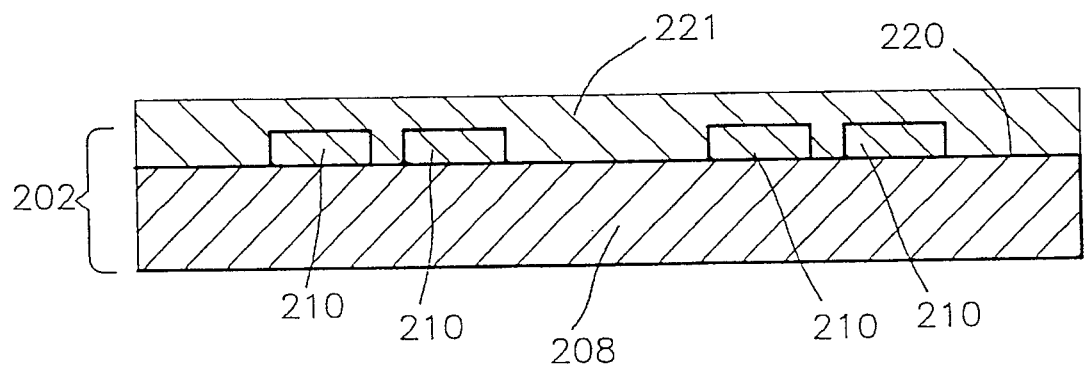

In the subsequent step, there is formed on the top surface 220 of the active matrix 202 a sacrificial layer 221 having a thickness of 1~2 μm and made of a metal, e.g., copper(Cu) or nickel(Ni), a phosphor-silicate glass(PSG) or poly-Si, by using a sputtering method if the sacrificial layer 221 is made of a metal, a chemical vapor deposition(CVD) method or a spin coating if the sacrificial layer 221 is made of a PSG, and a CVD method if the sacrificial layer 221 is made of poly-Si, as illustrated in FIG. 4B.

Figure 4C:
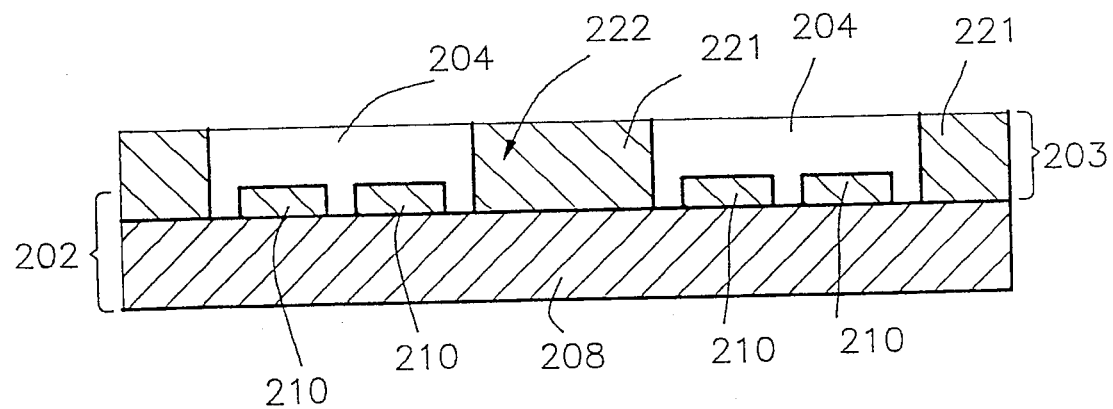

Subsequently, there is formed a first supporting layer 222 including the array 203 of M×N supporting members 204 and the sacrificial layer 221, wherein the first supporting layer 222 is formed by: creating an array of M×N empty slots (not shown) using a photolithography method, each of the empty slots being located around each pair of connecting terminals 210; and forming a supporting member 204, made of a ceramic, e.g., $Si_3N_4$, in each of the empty slots located around each pair of connecting terminals 210, using a sputtering method or a CVD method, as shown in FIG. 4C.

Figure 4D:
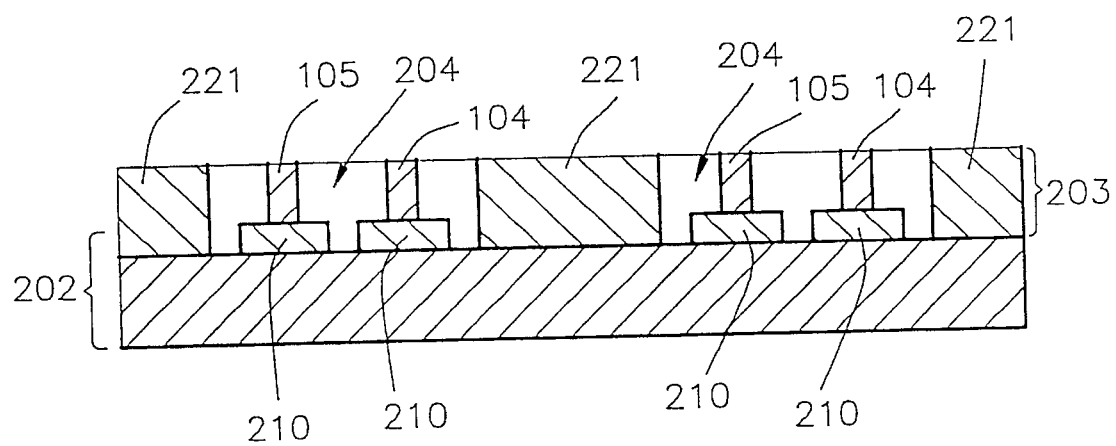

Thereafter, the first and the second conduits 104, 105 made of a metal, e.g., W, for electrically connecting the first layer 211 with the conduction line pattern and the second layer 215 with each one of the transistors, respectively, are formed in each of the supporting members 204 by: first creating a pair of holes (not shown), each of the holes extending from top of each of the supporting members 204 to top of the respective connecting terminal 210, using an etching method; and filling therein with a metal, e.g., W, as depicted in FIG. 4D.

Figure 4E:
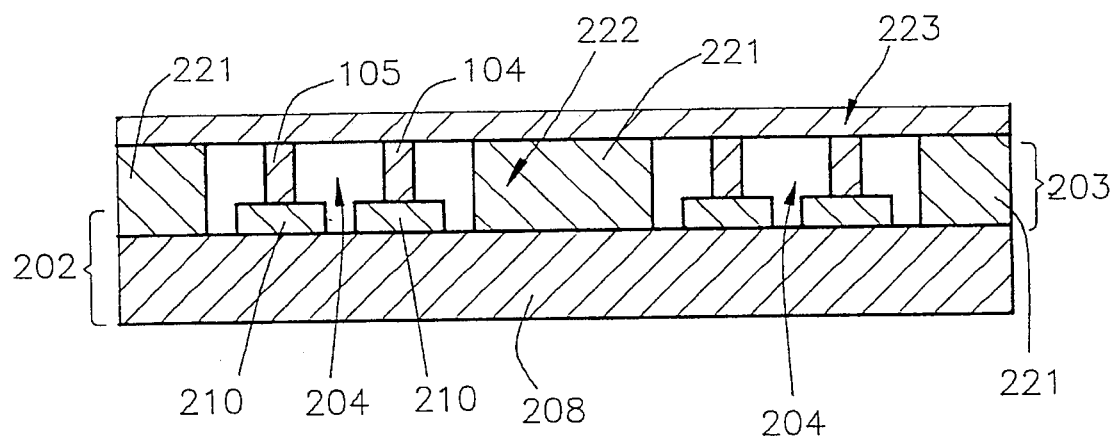

Subsequently, as shown in FIG. 4E, a second thin film layer 223, made of an electrically conducting material, e.g., Pt, and having a thickness of 0.7~2 μm, is formed on top of the first supporting layer 222 using a sputtering method. Each of the second layers 215 in each of the actuated mirrors is electrically connected to the corresponding transistor through the first conduit 104 formed in each of the supporting members 204.

In the subsequent step, the second conduit 105 is isolated electrically from the first conduit 104 in each of the supporting members 204 by first removing portions 107 of the second thin film layer 223 surrounding each of the second conduits 105 using, e.g., a photolithography, and filling the portions 107 with an insulating material, e.g., $SiO_2$.

Figure 4F:
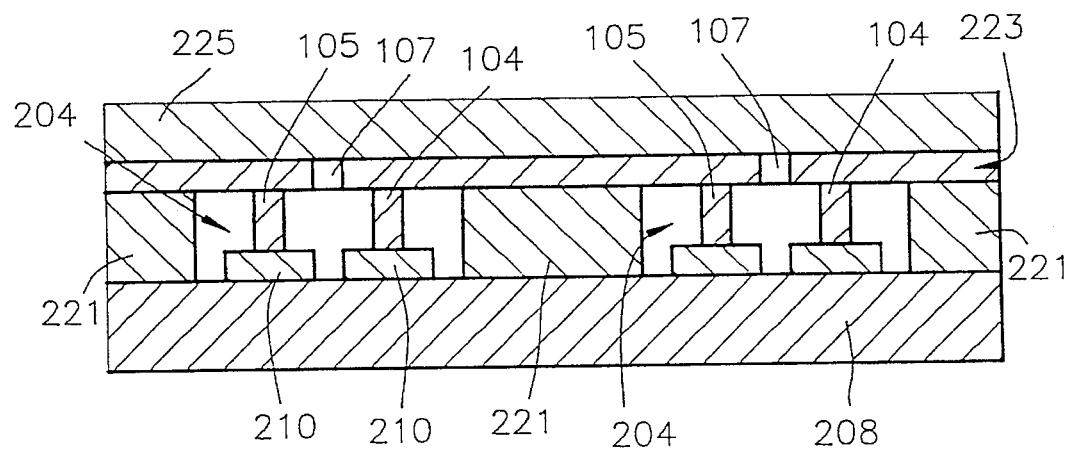

Thereafter, as shown in FIG. 4F, a thin film electrodisplacive layer 225 made of a piezoelectric material, e.g., PZT, or an electrostrictive material, e.g., PMN, and having a thickness of 0.7~2 μm, is formed on top of the second thin film layer 223 using a sol-gel method or a sputtering method, and then is heat treated to allow a phase transition thereof to take place. Since the thin film electrodisplacive layer 225 is sufficiently thin, there is no need to pole it: it can be poled with an electrical signal applied during the operation of a corresponding actuated mirror 201.

Figure 4G:
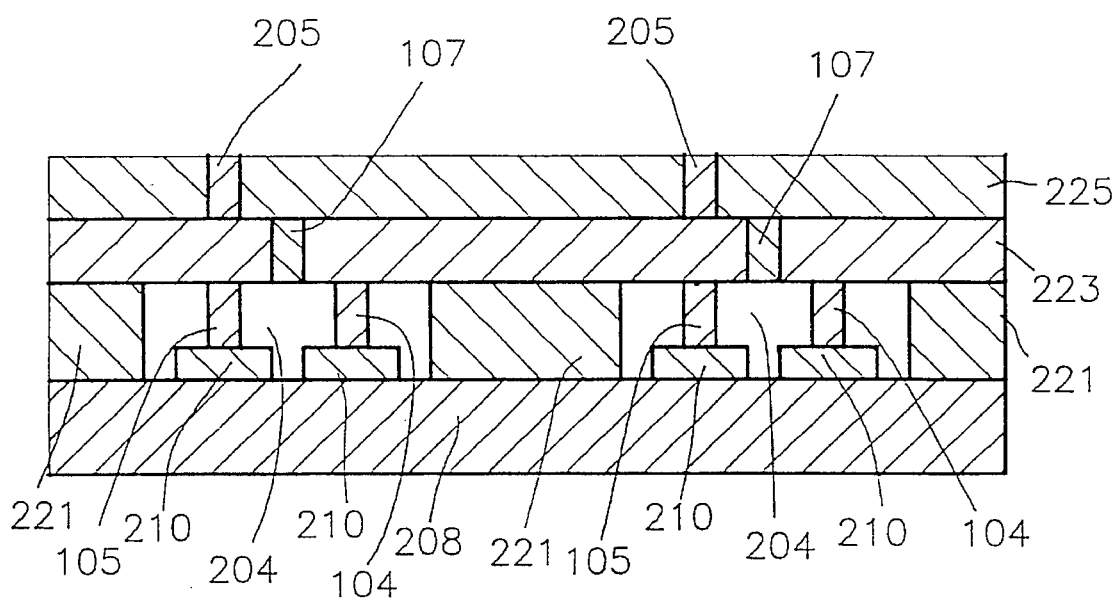

In the following step, an array of M×N third conduits 205 is formed on the electrodisplacive layer 225 by: first forming an array of M×N portions (now shown) without the electrodisplacive material on the thin film electrdisplacive layer 225 using a photolithography method, each of the portions being located on top of each of the portions of second thin film layer 223 containing the second conduit 105 and electrically isolated from the first conduit 104; and then filling the portions with an electrically conducting material, e.g., W, as shown in FIG. 4G, to form the array of M×N third conduits 205.

Figure 4H:
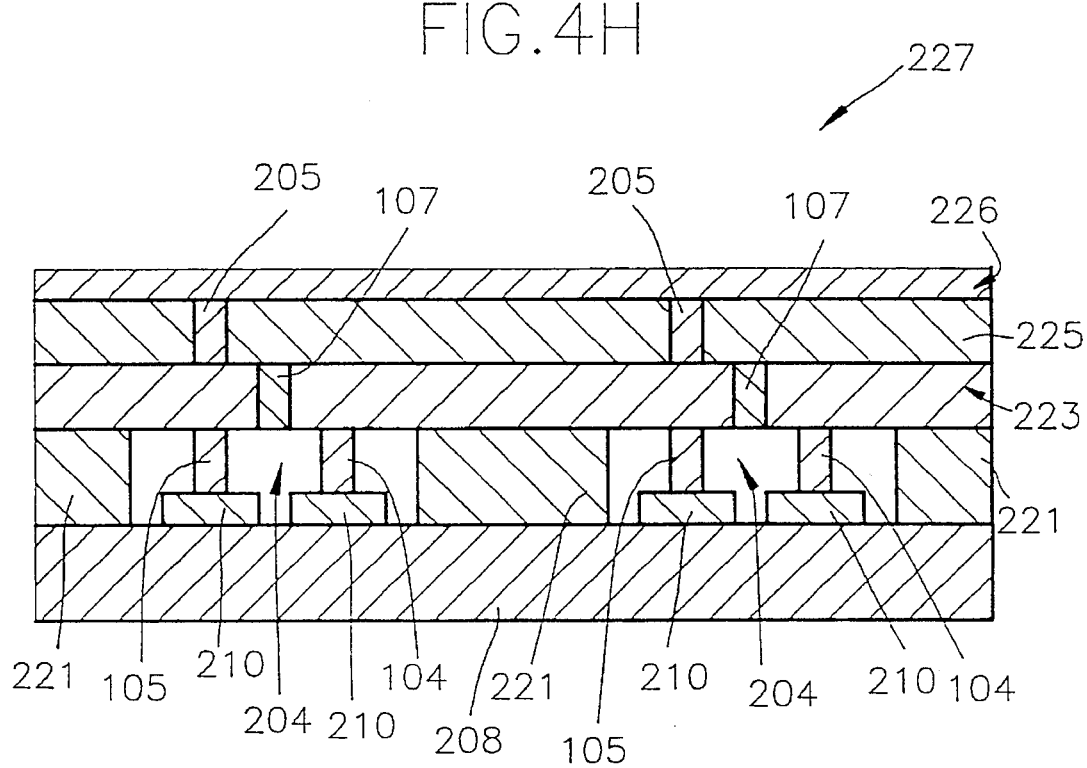
Figure 41:
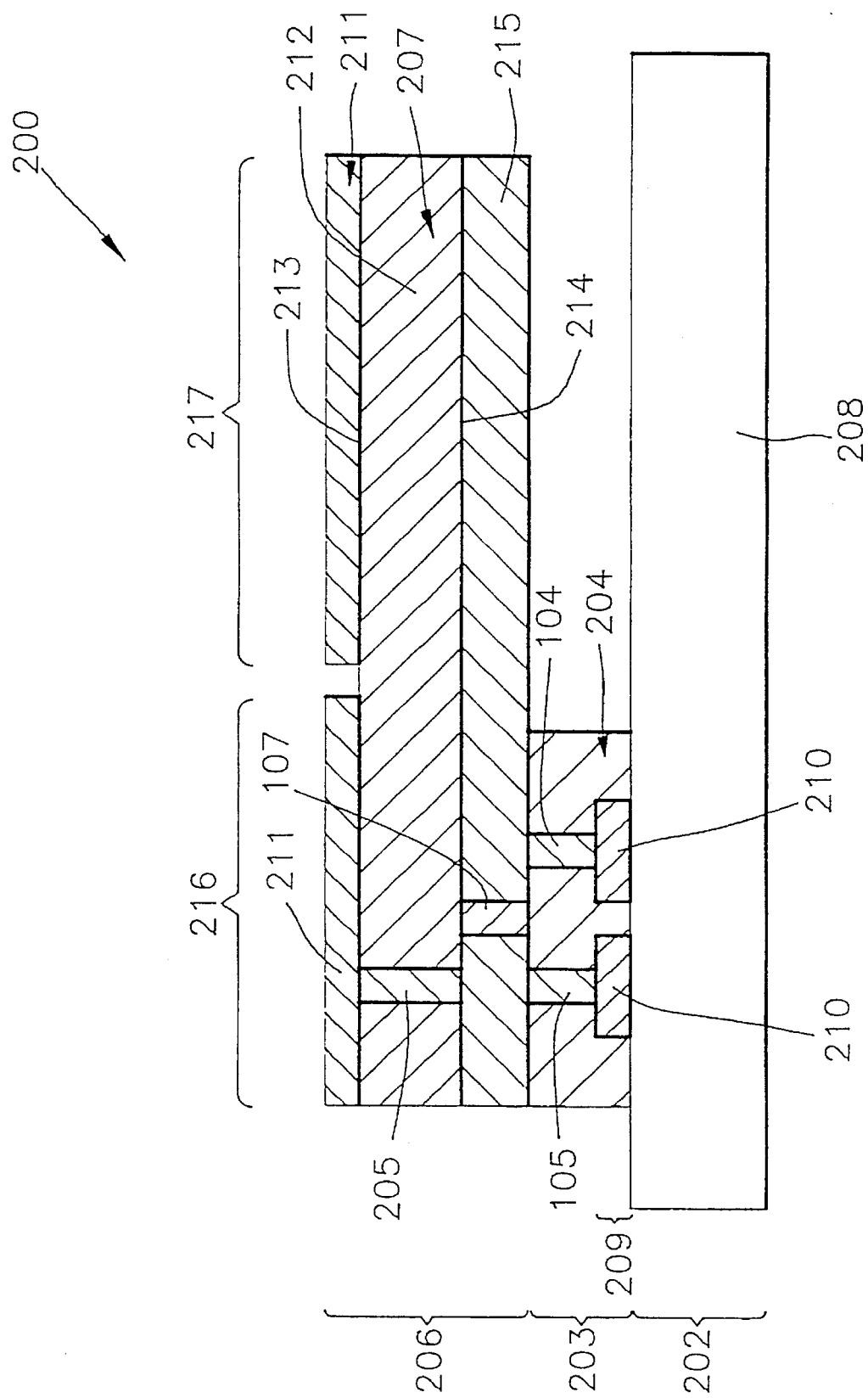

Thereafter, as depicted in FIG. 4H, a first thin film layer 226 made of an electrically conducting and light reflecting material, e.g., Ag, and having a thickness of 500~2000 Å, is formed on top of the thin film electrodisplacive layer 225 containing the array of M×N third conduits 205 using a sputtering method, thereby resulting in an actuated mirror structure 227.

The actuated mirror structure 227 is then patterned into an array of M×N semifinished actuated mirror structures (not shown) using a photolithography method or a laser trimming method. The first thin film layer 226 in each of the semifinished actuated mirror structures is then patterned into a proximal and a distal ends to form an array of M×N actuated mirror structures(not shown) using a photolithography, wherein the proximal and the distal ends thereof are physically and electrically separated from each other and the proximal end thereof is in an electrical contact with the third conduit 205 which in turn is in an electrical contact with the conduction line pattern through the second conduits 105 and the corresponding connecting terminal 210, thereby functioning as the bias electrode.

The sacrificial layer 221 in each of the actuated mirror structures is then removed using an etching method to form the array 200 of M×N thin film actuated mirrors 201, as shown in FIG. 4I.

While the present invention has been described with respect to certain preferred embodiments only, other modifications and variations may be made without departing from the scope of the present invention as set forth in the following claims.

What is claimed is:

1. An array of M×N thin film actuated mirrors for use in an optical projection system, each of the M×N thin film actuated mirrors capable of causing a deviation in the optical path of an incident light beam, said array comprising:

an active matrix including a substrate with an array of M×N pairs of connecting terminals on top of the substrate;

M×N trinities of a first, a second and a third conduits, wherein the first conduit is connected electrically to one of the connecting terminals in each pair thereof, and the second conduit, to the other connecting terminal in the pair;

an array of M×N supporting members, each of the supporting members being provided with the first and the second conduits; and an array of M×N actuating structures, each of the actuating structures including a first layer made of an electrically conducting and light reflecting material, an electrodisplacive layer having a top and a bottom surfaces, and a second layer made of an electrically conducting material, the first and the second layers being placed on the top and the bottom surfaces of the electrodisplacive layer, respectively, each of the actuating structures being provided with a proximal and a distal ends, the proximal end of each of the actuating structures being secured on top of each of the supporting members, the third conduit being formed between the first and the second layers, the first layer in each of the actuating structures being connected electrically to one of the connecting terminals in the pair through the second and the third conduits and the second layer therein is connected electrically to the other connecting terminal in the pair through the first conduit.

2. The method of claim 1, wherein the first layer in each of the actuated mirrors is divided physically and electrically into the proximal and the distal ends, the proximal end being electrically connected one of the connecting terminals in each pair thereof through the second and the third conduits and the distal end thereof functioning as a mirror for reflecting the incident light beam.

3. The array of claim 1, wherein the second layer in each of the actuated mirrors has a thickness of 0.7~2 μm.

4. The array of claim 1, wherein the electrodisplacive layer in each of the actuated mirrors has a thickness of 0.7~2 μm.

5. The array of claim 1, wherein the first and the second conduits in electrical contact with the second layer are electrically isolated from each other at the second layer by an insulating material.

6. The array of the claim 5, wherein the third conduit in each of the actuated mirrors is in an electrical contact with a part of the second layer in an electrical contact with the second conduit.

7. The array of claim 1, wherein the first layer in each of the actuated mirrors has a thickness of 500~2000 ÅA.

8. The array of claim 1, wherein the electrisplacive layer is made of a piezoelectric material or an electrostrictive material.

9. A method for manufacturing an array of M×N thin film actuated mirrors, said method comprising the steps of:

(a) providing an active matrix including a substrate with an array of M×N pairs of connecting terminals on a top surface of the substrate;

(b) depositing a sacrificial layer on top of the active matrix in such a way that the sacrificial layer completely covers the array of M×N pairs of connecting terminals;

(c) forming a supporting member around each pair of the connecting terminals;

(d) forming a pair of a first and a second conduits in each of the supporting members, each of the conduits extending from top of each of the supporting members to each of the connecting terminals;

(e) depositing a second thin film layer made of an electrically conducting material on top of the sacrificial layer and supporting members;

(f) isolating electrically the second conduit from the first conduit and hence the connecting terminals in each pair;

(g) forming a thin film electrodisplacive layer on top of the second layer;

(h) forming an array of M×N third conduits;

(i) depositing a first thin film layer made of an electrically conducting and light reflecting material to form an actuated mirror structure;

(j) patterning the actuated mirror structure into an array of M×N semifinished actuated mirror structures;

(k) patterning the first thin film layer in each of the semifinished actuated mirror structures into a proximal and a distal ends to form an array of M×N actuated mirror structures, wherein the proximal and the distal ends thereof are separated physically and electrically from each other and the proximal and thereof is in an electrical contact with the third conduit; and (l) removing the sacrificial layer from each of the actuated mirror structures to thereby form said array of M×N thin film actuated mirrors.

10. The method of claim 9, wherein the sacrificial layer is formed by using a sputtering method when the sacrificial layer is made of a metal, a chemical vapor deposition method when the sacrificial layer is made of a phosphor-silicate glass, or a spin coating method when the sacrificial layer is made of a poli-Si.

11. The method of claim 9, wherein the second thin film layer is deposited by using a sputtering method.

12. The method of claim 9, wherein the thin film electrodisplacive layer is formed by using a sol-gel method or a sputtering method.

13. The method of claim 9, where the first thin film layer is deposited by using a sputtering method or a vacuum evaporation method.

14. The method of claim 9, wherein the actuated mirror structure is patterned using a photolithography method or a laser trimming method.

15. The method of claim 9, wherein the sacrificial layer is removed by an etching method.

16. The method of claim 9, wherein the supporting members are formed by: removing portions of the sacrificial layer surrounding each pair of the connecting terminals; and filling the portions with an insulating material.

17. The method of claim 9, wherein the second conduit is electrically isolated from the first conduit by: removing portions of the second thin film layer surrounding each of the second conduits; and filling the portions with an insulating material.

18. The method of claim 9, wherein the third conduits are formed by: forming an array of M×N portions without the electrodisplacive material on the thin film electrodisplacive layer; and filling therein with an electrically conducting material.

* * * * *